United States Patent
Taniguchi et al.

(10) Patent No.: US 8,009,345 B2
(45) Date of Patent: Aug. 30, 2011

(54) CRYSTALLIZATION APPARATUS, CRYSTALLIZATION METHOD, DEVICE, AND LIGHT MODULATION ELEMENT

(75) Inventors: Yukio Taniguchi, Yokohama (JP);
Masakiyo Matsumura, Kamakura (JP);
Kazufumi Azuma, Yokohama (JP);
Tomoya Kato, Yokohama (JP);
Takahiko Endo, Yokohama (JP)

(73) Assignee: Advanced LCD Technologies Development Center Co., Ltd., Yokohama-shi (JP)

( * ) Notice: Subject to any disclaimer, the term of this patent is extended or adjusted under 35 U.S.C. 154(b) by 0 days.

(21) Appl. No.: 12/962,750

(22) Filed: Dec. 8, 2010

(65) Prior Publication Data
US 2011/0075237 A1 Mar. 31, 2011

Related U.S. Application Data

(62) Division of application No. 12/051,213, filed on Mar. 19, 2008, now Pat. No. 7,897,946.

(30) Foreign Application Priority Data

Mar. 23, 2007 (JP) ................................ 2007-076609

(51) Int. Cl.
*G02F 1/01* (2006.01)
(52) U.S. Cl. ........................................ 359/279; 359/240
(58) Field of Classification Search .................. 359/240, 359/279
See application file for complete search history.

(56) References Cited

U.S. PATENT DOCUMENTS

| | | | |
|---|---|---|---|
| 6,686,287 B1 | 2/2004 | Dohi | |
| 7,011,709 B2 | 3/2006 | Taniguchi et al. | |
| 7,214,270 B2 | 5/2007 | Taniguchi et al. | |
| 7,217,319 B2 | 5/2007 | Matsumura et al. | |
| 7,227,679 B2 * | 6/2007 | Taniguchi | 359/279 |
| 7,239,374 B2 | 7/2007 | Taniguchi et al. | |
| 7,311,771 B2 | 12/2007 | Taniguchi et al. | |
| 7,347,897 B2 | 3/2008 | Kato et al. | |
| 7,410,848 B2 | 8/2008 | Jyumonji et al. | |
| 7,540,921 B2 | 6/2009 | Matsumura et al. | |
| 7,608,148 B2 | 10/2009 | Matsumura et al. | |
| 7,803,520 B2 | 9/2010 | Taniguchi et al. | |

(Continued)

FOREIGN PATENT DOCUMENTS

JP 2004-343073 12/2004

(Continued)

OTHER PUBLICATIONS

Office Action mailed Sep. 17, 2010, in co-pending U.S. Appl. No. 12/277,732.

(Continued)

*Primary Examiner* — David N Spector
(74) *Attorney, Agent, or Firm* — Oblon, Spivak, McClelland, Maier & Neustadt, L.L.P.

(57) ABSTRACT

A crystallization apparatus includes a light modulation element, and an image forming optical system that forms a light intensity distribution set based on light transmitted through the light modulation element on an irradiation surface. The crystallization apparatus irradiates a non-single crystal semiconductor film with light having the light intensity distribution to generate a crystallized semiconductor film. A curvature radius of at least one isointensity line of a light intensity substantially varies along the isointensity line in the light intensity distribution on the irradiation surface, and a curvature radius of at least a part of the isointensity line has a minimum value of 0.3 μm or below.

3 Claims, 11 Drawing Sheets

U.S. PATENT DOCUMENTS

| | | | |
|---|---|---|---|
| 7,813,022 B2 * | 10/2010 | Taniguchi | 359/238 |
| 2004/0005744 A1 | 1/2004 | Taniguchi et al. | |
| 2004/0058484 A1 | 3/2004 | Taniguchi et al. | |
| 2004/0107892 A1 | 6/2004 | Matsumura et al. | |
| 2004/0191645 A1 | 9/2004 | Taniguchi et al. | |
| 2004/0214414 A1 | 10/2004 | Matsumura et al. | |
| 2004/0266080 A1 | 12/2004 | Jyumonji et al. | |
| 2005/0162632 A1 | 7/2005 | Taniguchi et al. | |
| 2005/0223970 A1 | 10/2005 | Taniguchi et al. | |
| 2006/0027162 A1 | 2/2006 | Kato et al. | |
| 2006/0186412 A1 | 8/2006 | Jyumonji et al. | |
| 2006/0254500 A1 | 11/2006 | Im et al. | |
| 2007/0006796 A1 | 1/2007 | Matsumura et al. | |
| 2007/0151507 A1 | 7/2007 | Taniguchi et al. | |
| 2007/0215037 A1 | 9/2007 | Taniguchi | |
| 2009/0057764 A1 | 3/2009 | Okada et al. | |
| 2009/0134394 A1 | 5/2009 | Azuma et al. | |
| 2009/0278060 A1 | 11/2009 | Taniguchi et al. | |

FOREIGN PATENT DOCUMENTS

| | | |
|---|---|---|
| JP | 2005-129915 | 5/2005 |
| WO | WO 2008/099526 A1 | 8/2008 |

OTHER PUBLICATIONS

Robert S. Sposili et al., "Sequential Lateral Solidification of Thin Silicon Films on $SiO_2$", Applied Physics Letters, Nov. 4, 1996, vol. 69, No. 19, pp. 2864-2866.

Akito Hara et al., "High-Performance Polycrystalline Silicon Thin Film Transistors on Non-Alkali Glass Produced Using Continuous Wave Laser Lateral Crystallization", Japanese Journal of Applied Physics, Mar. 15, 2002, vol. 41, Part 2, No. 3B, pp. L311-L313.

James S. Im et al., "Phase Transformation Mechanisms Involved in Excimer Laser Crystallization of Amorphous Silicon Films", Applied Physics Letters, Oct. 4, 1993, vol. 63, No. 14, pp. 1969-1971.

Masakiyo Matsumura, "Preparation of Ultra-Large Grain Silicon Thin-Films by Excimer-Laser", Journal of the Surface Science Society of Japan, vol. 21, No. 5, May 2000, pp. 32-41.

* cited by examiner

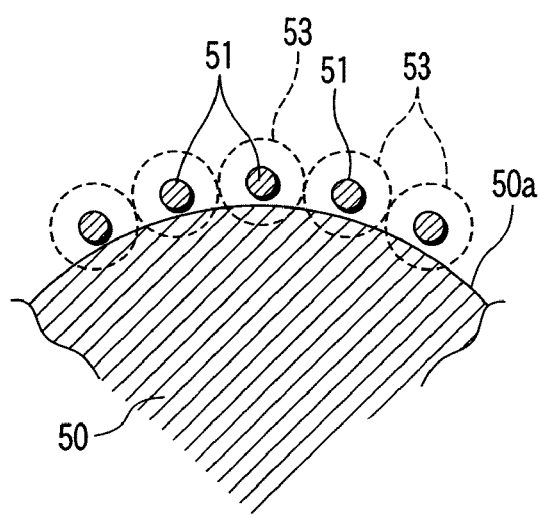
F I G. 4A
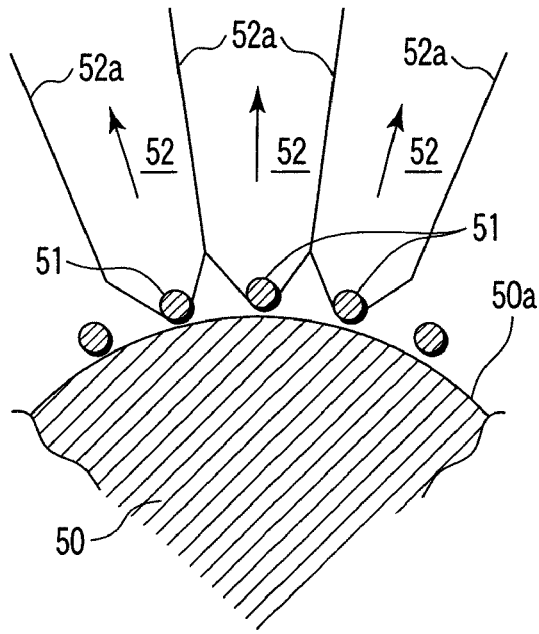
F I G. 4B
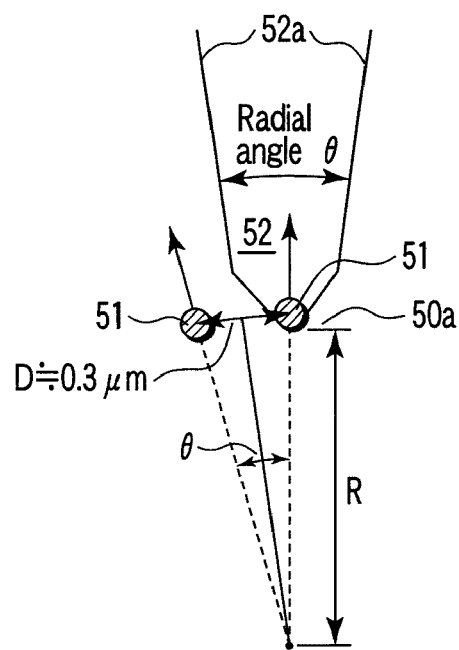
F I G. 5

R=0.2 μm, θ=100°      R=0.3 μm, θ=60°     R=0.4 μm, θ=40°

CRYSTALLIZATION APPARATUS, CRYSTALLIZATION METHOD, DEVICE, AND LIGHT MODULATION ELEMENT

CROSS-REFERENCE TO RELATED APPLICATIONS

This application is a Divisional application of application Ser. No. 12/051,213, filed Mar. 19, 2008 and is based upon and claims the benefit of priority from prior Japanese Patent Application No. 2007-076609, filed Mar. 23, 2007, the entire contents of which are incorporated herein by reference.

BACKGROUND OF THE INVENTION

1. Field of the Invention

The present invention relates to a crystallization apparatus, a crystallization method, a device, and a light modulation element. More particularly, the present invention relates to a technology of irradiating a non-single crystal semiconductor film with a laser beam having a predetermined light intensity distribution to generate a crystallized semiconductor film.

2. Description of the Related Art

A thin film transistor (TFT) used for, e.g., a switching element that selects a display pixel in a liquid crystal display (LCD) and others is conventionally formed by using amorphous silicon or polysilicon.

A mobility of electrons or holes of the polysilicon is higher than that of the amorphous silicon. Therefore, when the polysilicon is used to form a transistor, a switching speed is increased and response of a display thereby becomes faster as compared with a case where the amorphous silicon is used to form a transistor. Additionally, a peripheral LSI can be formed of a thin film transistor. Further, there is an advantage of reducing a design margin of any other component. Furthermore, when incorporating peripheral circuits such as a driver circuit or a DAC, these peripheral circuits can be operated at a higher speed.

Since the polysilicon is formed of an aggregate of crystal grains, when this polysilicon is used to form, e.g., a TFT transistor, a crystal grain boundary is present in a channel region of this transistor, and this crystal grain boundary serves as a barrier to reduce a mobility of electrons or holes as compared with that of single-crystal silicon. Moreover, in case of many thin film transistors formed by using the polysilicon, a number of crystal grain boundaries formed in a channel region varies depending on each of the thin film transistors, and this becomes unevenness of characteristics of the thin film transistors, resulting in a problem of display unevenness in case of a liquid crystal display. Thus, in order to improve a mobility of electrons or holes and reduce unevenness of the number of crystal grain boundaries in each channel region, a crystallization method that generates crystallized silicon having a large particle diameter enabling formation of one channel region has been recently proposed.

As this type of crystallization method, a "phase control ELA (Excimer Laser Annealing) method" of irradiating a phase shifter (a light modulation element) with an excimer laser beam and irradiating a non-single crystal semiconductor film (a polycrystal semiconductor film or a non-single crystal semiconductor film) with a Fresnel diffraction image obtained by this process or an image formed by an image forming optical system to generate a crystallized semiconductor film has been conventionally known. Particulars of the phase control ELA method is disclosed in, e.g., Surface Science, Vol. 21, No. 5, pp. 278-287, 2000.

According to the phase control ELA method, a light intensity distribution having an inverse peak pattern in which a light intensity at a point corresponding to a phase shift portion of the phase shifter is lower than that at a periphery (a pattern in which a light intensity is lowest at the center and the light intensity is precipitously increased toward the periphery) is generated, and the non-single crystal semiconductor film is irradiated with light having the light intensity distribution of this inverse peak shape. As a result, a temperature gradient is generated in a melting region in an irradiation target region in accordance with the light intensity distribution, a crystal nucleus is formed in a portion which is solidified first or a portion which is not molten in accordance with a point where the light intensity is minimum, and a crystal grows from this crystal nucleus toward the periphery in a lateral direction (which will be referred to as "lateral growth" or "grown in the lateral direction" hereinafter), thereby generating a single-crystal grain having a large particle diameter.

The present inventor has proposed a technology of forming a light intensity distribution having an inverse peak shape at a position where a light intensity is minimum in the light intensity distribution having a V-shaped pattern to radially generate crystal grains each having a very large width (see JP-A 2004-343073 (KOKAI)). Moreover, the present inventor has also proposed a technology of generating a combined distribution of a light intensity distribution having a V-shaped pattern and a light intensity distribution having an inverse peak pattern extending in one direction to generate sufficient lateral growth from a crystal nucleus along a gradient direction of the light intensity (see JP-A 2005-129915 (KOKAI)).

For example, the conventional crystallization technology disclosed in JP-A 2004-343073 (KOKAI), although crystal growth is radially carried out from an end portion of a non-melting region on a non-single crystal semiconductor film, a spread angle of the crystal growth at this moment, i.e., a radial angle defined by a pair of radially extended crystal grain boundaries is relatively narrow. As a result, a probability that the crystal grain boundary intrudes a channel region of a TFT is high, and an electric field effect mobility is lowered by carrier scattering due to this crystal grain boundary in the channel region.

BRIEF SUMMARY OF THE INVENTION

It is an object of the present invention to provide a crystallization apparatus, a crystallization method, a device, and a light modulation element that can realize crystal growth at a sufficiently large radial angle to prevent a crystal grain boundary from intruding a channel region of, e.g., a TFT.

To achieve this object, according to a first aspect of the present invention, there is provided a. crystallization apparatus comprising: a light modulation element; and an image forming optical system that forms a light intensity distribution set based on light transmitted through the light modulation element on an irradiation surface, the crystallization apparatus irradiating a non-single crystal semiconductor film with light having the light intensity distribution to generate a crystallized semiconductor film, wherein a curvature radius of at least one isointensity line of a light intensity substantially varies along the isointensity line in the light intensity distribution on the irradiation surface, and a curvature radius of at least a part of the isointensity line has a minimum value of 0.3 μm or below.

According to a second aspect of the present invention, there is provided a crystallization method of irradiating a non-single crystal semiconductor film with light having a predetermined light intensity distribution to generate a crystallized semiconductor film, wherein the non-single crystal semiconductor film is irradiated with light having a light intensity distribution in which a curvature radius of at least a part of an isointensity line of a light intensity is 0.3 µm or below.

According to a third aspect of the present invention, there is provided a device manufactured by the crystallization apparatus according to the first aspect or the crystallization method according to the second aspect.

According to a fourth aspect of the present invention, there is provided a light modulation element that is used in the crystallization apparatus according to the first aspect or the crystallization method according to the second aspect to form the predetermined light intensity distribution.

According to a fifth aspect of the present invention, there is provided a light modulation element which forms a predetermined light intensity distribution based on incident light, wherein a basic pattern of the light modulation element has a first strip-like region and a second strip-like region adjacent to the first strip-like region, a ratio of a first region having a first phase value and a second region having a second phase value varies in a first direction along a boundary line between the first strip-like region and the second strip-like region and a second direction perpendicular to the boundary line in accordance with each unit region in the first strip-like region, and a ratio of the first region having the first phase value and a third region having a third phase value varies in the first direction and the second direction in accordance with each unit region in the second strip-like region.

In the present invention, a non-single crystal semiconductor film is irradiated with light having a light intensity distribution in which at least a part of an isointensity line of a light intensity associated with a melting temperature of the non-single crystal semiconductor film has a curvature radius of 0.3 µm or below. As a result, in the present invention, crystal growth at a sufficiently large radial angle can be realized to prevent a crystal grain boundary from intruding a channel region of, e.g., a TFT, and a reduction in an electric field effect mobility by carrier scattering due to a crystal grain boundary in the channel region can be avoided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a view showing a state immediately after crystal nuclei are formed, and FIG. 4B is a view showing a model for explaining a state after crystals grow from the crystal nuclei;

FIG. 5 is a view showing a model for explaining a radial angle of one crystal grain;

FIGS. 7A to 7C are views associated with FIG. 3, in which FIG. 7A shows a state of crystallization when a curvature radius of an isointensity line is set to 0.2 µm, FIG. 7B shows a state of crystallization when the curvature radius is set to 0.3 µm, and FIG. 7C shows a state of crystallization when the curvature radius is set to 0.4 µm;

FIGS. 9A and 9B are views each showing a light intensity distribution in a region where crystals grow from crystal nuclei in the form of isointensity lines, in which FIG. 9A shows a light intensity distribution having substantially the same gradient in a radial direction and FIG. 9B shows a light intensity distribution in which a gradient is highest in a front direction of a channel region;

DETAILED DESCRIPTION OF THE INVENTION

Figure 1:
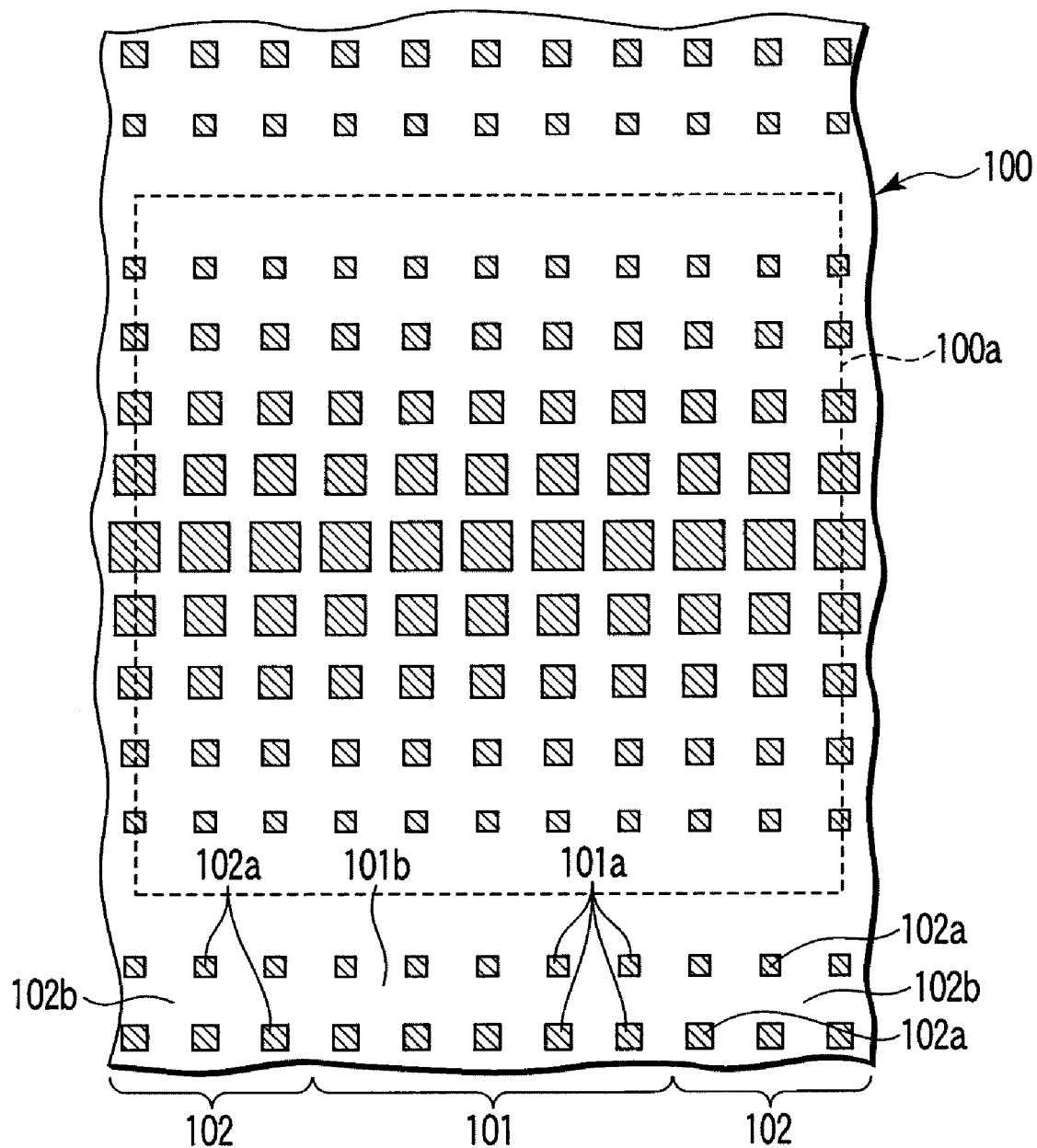
FIG. 1 is a view schematically showing a structure of a light modulation element used in a conventional crystallization technology.
Figure 2:
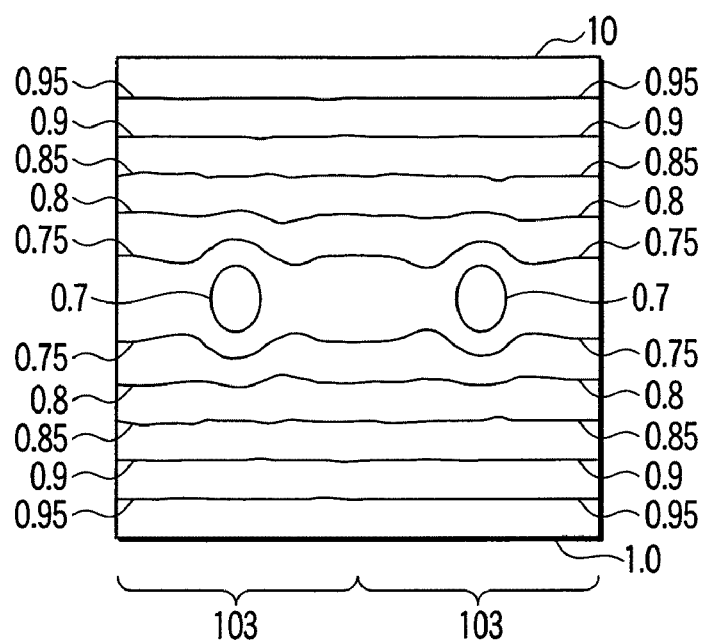
FIG. 2 is a view showing a light intensity distribution formed on a non-single crystal semiconductor film by using the light modulation element depicted in FIG. 1 in the form of isointensity lines.

Prior to specific explanation of an embodiment according to the present invention, a problem of a conventional crystallization technology and a basic concept of the present invention will be explained hereinafter. For example, in the conventional technology disclosed in JP-A 2004-343073, a light modulation element 100 having an irregular pattern subjected to area modulation as shown in FIG. 1 is used to form such a light intensity distribution as depicted in FIG. 2 on a non-single crystal semiconductor film. FIG. 2 shows the light intensity distribution formed on the non-single crystal semiconductor film in accordance with a rectangular region 100a indicated by a broken line in FIG. 1 in the form of contour lines (i.e., isointensity lines) of a light intensity when a light intensity at the time of no modulation is standardized as 1.0.

The light modulation element 100 depicted in FIG. 1 has a repeated structure along one direction (a horizontal direction in the figure) of a first strip-like region 101 and a second strip-like region 102. In the first strip-like region 101, each rectangular region 101a indicated by a hatching portion in the figure has a predetermined phase value of, e.g., −60 degrees, and a region 101b indicated by a blank portion in the figure has a different phase value of, e.g., 0 degree. On the other hand, in the second strip-like region 102, each rectangular region 102a indicated by a hatching portion in the figure has a predetermined phase value of, e.g., +60 degrees, and a region 102b indicated by a blank portion in the figure has a different phase value of, e.g., 0 degree. When using a phase value in an explanation of the light modulation element, this value represents a phase modulation amount when light is transmitted through the light modulation element, and a phase advance direction is a positive direction. For example, in regard to a phase value of 0 degree as a reference, a value of +60 degrees means phase advance of 60 degrees, and a value of −60 degrees means phase retardation of 60 degrees. These phase modulations can be realized by, e.g., forming a surface of a light transmitting substrate into an irregular shape.

Referring to FIG. 2, it can be understood that using the light modulation element 100 depicted in FIG. 1 enables obtaining a light intensity distribution having a V-shaped pattern in which a light intensity is monotonously decreased from 1.0 to 0.7 from an upper side toward a center along a perpendicular direction and the light intensity is monotonously increased from 0.75 to 1.0 from the center toward a lower side along the perpendicular direction in FIG. 2. In this light intensity distribution having the V-shaped pattern, a minimum light intensity having an inverse peak pattern is formed at each position where the light intensity is minimum (each of two positions separated in a horizontal direction at the center in FIG. 2) and which corresponds to a boundary line between the strip-like region 101 and the strip-like region, or specifically each position indicated by an elliptic isointensity line having the light intensity of 0.7 in FIG. 2.

Figure 3:
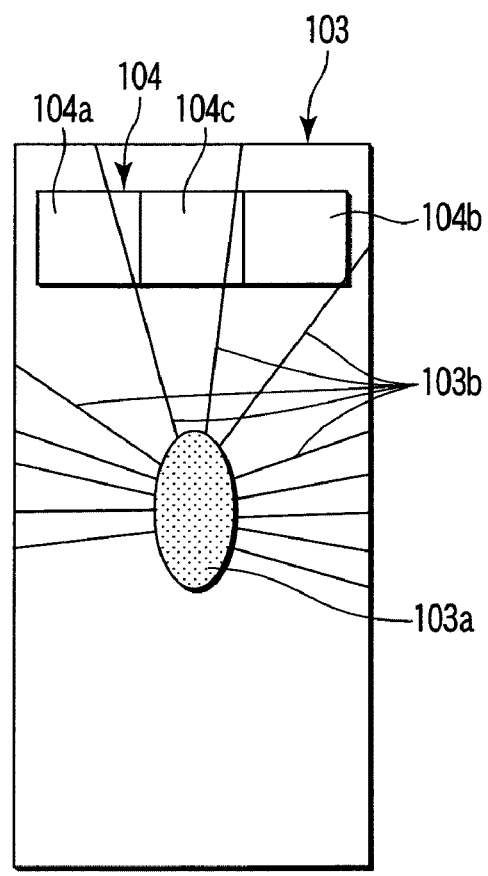
FIG. 3 is a view schematically showing a state of crystallization when the non-single crystal semiconductor film is irradiated with light having the light intensity distribution depicted in FIG. 2.

When the non-single crystal semiconductor film is irradiated with light having such a light intensity distribution as shown in FIG. 2, a non-melting region 103a is formed in one crystallization unit region 103 on the non-single crystal semiconductor film in association with the elliptic isointensity line having the light intensity of 0.7 as schematically shown in FIG. 3. Additionally, a plurality of crystals radially grow from the non-melting region 103a or crystal nuclei formed around this region (crystal nuclei formed from the non-melting region 103a toward the lower side are omitted in the figure). In other words, a plurality of crystal grain boundaries 103b are radially formed to be extended from the non-melting region 103a or the crystal nuclei around this region. At this time, a maximum angle in angles between the crystal grain boundaries adjacent to each other, i.e., a spread angle of crystal growth (which will be referred to as a "radial angle" hereinafter) is relatively narrow.

Therefore, as shown in FIG. 3, when a TFT 104 is formed in the crystallization unit region 103, a probability that at least one crystal grain boundary 103b intrudes a channel region 104c between a source 104a and a drain 104b of the TFT is very high, and an electric field effect mobility is thereby lowered by carrier scattering due to the crystal grain boundary 103b in the channel region 104c.

The present inventor has examined about a curvature radius of an isointensity line corresponding to an outer edge of the non-melting region where the non-crystal semiconductor film is not completely molten, i.e., the curvature radius of the isointensity line of a light intensity associated with a melting temperature of the non-single crystal semiconductor film. As a result, he/she has discovered that, if the curvature radius of at least a part of the isointensity line is 0.3 μm or below, crystal growth at a radial angle sufficiently large to prevent the crystal grain boundary from intruding the channel region of the TFT can be realized. A description will now be given as to the fact that the crystal grain boundary does not intrude the channel region when the curvature radius of at least a part of the isointensity line of a light intensity associated with a melting temperature of the non-single crystal semiconductor film is 0.3 μm or below.

When the non-single crystal semiconductor or silicon film (an amorphous silicon film) formed on a substrate is irradiated with light, amorphous silicon is not completely molten but at least partially remains in a region irradiated with light having a light intensity associated with a melting temperature or a lower light intensity (i.e., a non-melting region). On the other hand, in a region around the non-melting region, the amorphous silicon is completely molten. Then, a temperature of the non-single crystal semiconductor film is lowered due to, e.g., heat conduction to the substrate side, but crystal nuclei 51 are formed near a region where a temperature is minimum in a melting region, i.e., near the non-melting region 50.

In generation of these crystal nuclei 51, small solid particles repeat generation and annihilation in a liquid, and solid particles which have reached a predetermined size alone are stabilized to become the crystal nuclei 51. Then, as shown in FIG. 4B, crystals rapidly radially grow along directions indicated by arrows in the figure with the crystal nuclei 51 serving as base points (in the figure, crystals which grow from outer crystal nuclei 51 are omitted). In a process of generation of these crystal nuclei 51, it is known that latent heat is discharged when the liquid changes its phase into a solid matter and the crystal nuclei 51 are generated with a fixed density alone to again melt nearby solid particles.

The generation density of the crystal nuclei has been obtained by an experiment in a literature "J. S. Im and H. J. Kim, "Phase transformation mechanisms involved in excimer laser crystallization of amorphous silicon films", Appl. Phys. Lett. 63(14), 4 Oct. 1993" (see FIG. 2 in this literature in particular). In this experiment, a particle diameter of each crystal obtained by irradiating amorphous silicon with an XeCl excimer laser having a uniform intensity distribution while changing a fluence (an irradiation intensity) is measured. As a result of the experiment, it was revealed that a crystal particle diameter becomes approximately 0.3 μm at a maximum by applying light having an optimum fluence at a room temperature. Considering that one crystal grain grows from one crystal nucleus, this experimental result represents that the generation density of the crystal nuclei has an interval of approximately 0.3 μm. Since this interval is determined by a micro phenomenon as explained in the former section, it can be considered that both application of light having a uniform light intensity distribution like this experiment and application of light having a light intensity distribution with a gradient like the present invention are effective.

Since a regular glass substrate used in a liquid crystal display does not have heat resistance, processing at a substantially room temperature is necessary. Further, a higher density of crystal nuclei is desirable as will be explained later, and light is generally applied with a fluence that enables obtaining a maximum particle diameter. At this time, as shown in FIG. 4B, considering that one crystal grain 52 defined by the two crystal grain boundaries 52a adjacent to each other grows from one crystal nucleus 51, a radial angle of each crystal grain is associated with a density of the crystal nuclei 51. That is, a maximum interval of the crystal nuclei 51 obtained when irradiating the amorphous silicon with the XeCl excimer laser beam at a room temperature is approximately 0.3 μm. In other words, as shown in FIG. 5, an interval D between the crystal nuclei 51 is approximately 0.3 μm. FIG. 4A shows a range having a diameter of approximately 0.3 μm with each crystal nucleus 51 at the center is represented by a circle 53 of a broken line.

Although the crystal grain 52 can be substantially radially obtained from the crystal nucleus, a radial angle θ (a full size) of one crystal grain 52 is given from a model depicted in FIG. 5 by the following Expression (1). In Expression (1), R (a unit: μm) is a curvature radius of an isointensity line 50a corresponding to an outer edge of the non-melting region 50 (an isointensity line of a light intensity associated with a melting temperature) near the crystal nucleus 51. It is to be noted that a numerical value 0.3 in Expression (1) means 0.3 μm.

$$\theta = 2\sin^{-1}\left(\frac{0.3}{2R}\right) \quad (1)$$

Figure 6:
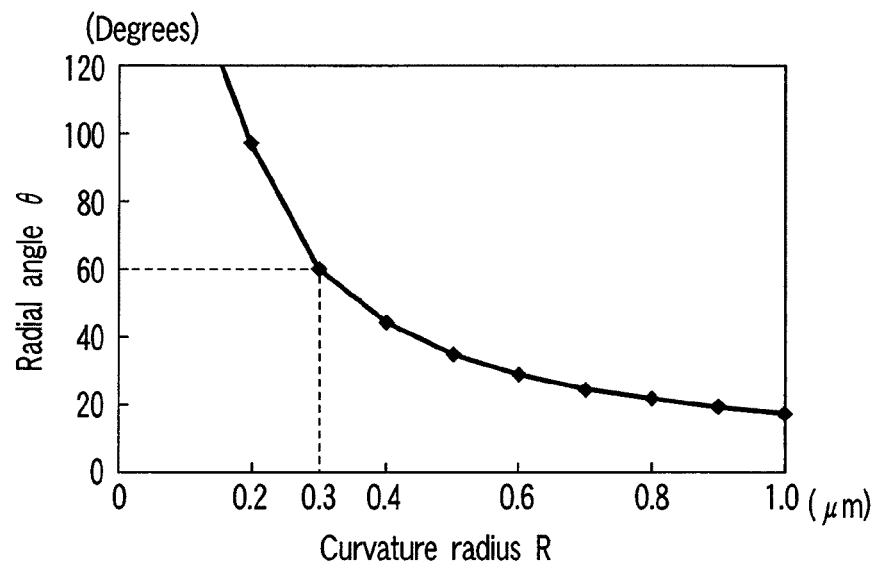
FIG. 6 is a view showing a relationship between a curvature radius R of an isointensity line and a radial angle θ of a crystal grain in the model depicted in FIG. 5.

FIG. 6 is a view showing a relationship between the curvature radius R of the isointensity line 50a calculated from Expression 1 and the radial angle θ of the crystal grain 52 in the model depicted in FIG. 5. Referring to FIG. 6, it can be understood that the radial angle θ of the crystal grain 52 is precipitously reduced when the curvature radius R of the isointensity line 50a corresponding to the outer edge of the non-melting region 50 exceeds 0.3 μm. The radial angle θ obtained when the curvature radius R is 0.3 μm is approximately 60 degrees. Considering that the TFT is fabricated after crystallization, the radial angle θ of the crystal grain 52 must be approximately 60 degrees or above. This point will now be verified with reference to FIGS. 7A to 7C associated with FIG. 3.

Figures 7A, 7B, 7C:
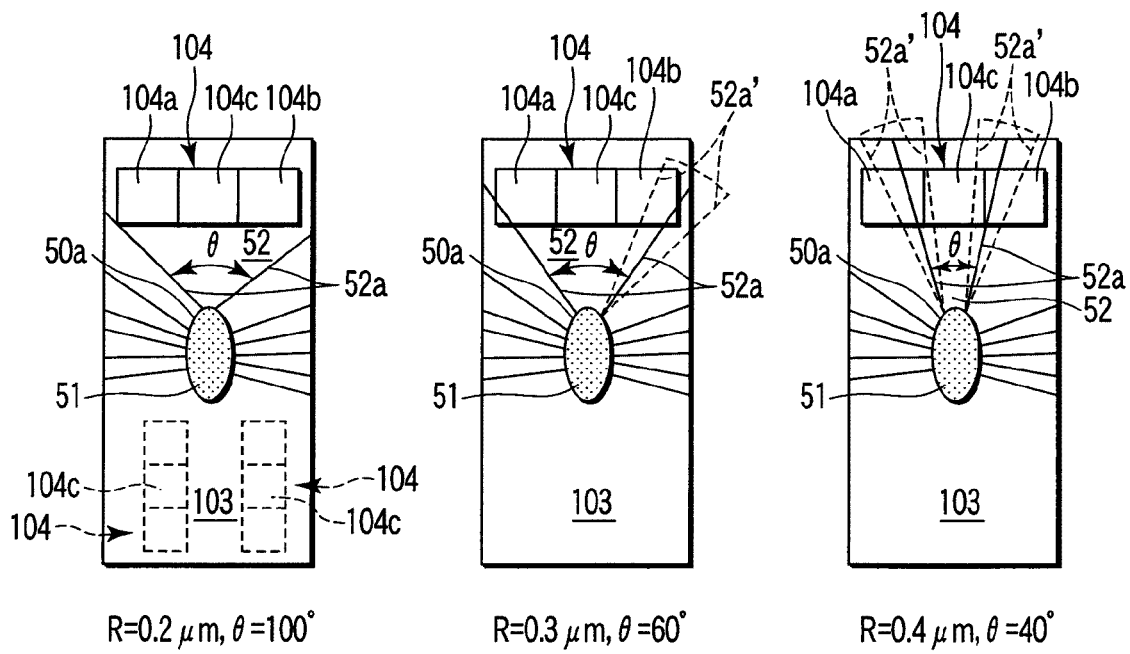

FIG. 7A shows a state of crystallization when the curvature radius R of the isointensity line 50a is set to 0.2 μm, FIG. 7B shows a state of crystallization when the curvature radius R is set to 0.3 μm, and FIG. 7C shows a state of crystallization when the curvature radius R is set to 0.4 μm. In FIGS. 7A to 7C, a length of the channel region 104c (a length in the horizontal direction in the figure) is set to a value 1.5 μm which is used in an existing current liquid crystal display. Each of FIGS. 7A to 7C shows one crystallization unit region 103 in many crystallization unit regions two-dimensionally repeatedly formed on the non-single crystal semiconductor film. Considering that a length with which a crystal can stably grow is approximately 5 μm, a size of the crystallization unit region 103 is set to 10 μm and 5 μm in length and breadth in the figure.

When the size of the crystallization unit region 103 is smaller than 10 μm×5 μm, a crystal grain that completely covers the channel region 104c cannot be generated. On the other hand, when the size of the crystallization unit region 103 is larger than 10 μm×5 μm, the entire surface of the crystallization unit region 103 cannot be crystallized since growth of crystal ends halfway. Referring to FIG. 7A, when the curvature radius R of the isointensity line 50a in the model depicted in FIG. 5 is 0.2 μm, the radial angle θ of the crystal grain 52 becomes 100 degrees, and hence the crystal grain boundary 52a does not intrude the channel region 104c, thereby effecting excellent crystallization. In FIG. 7A, a TFT formed to allow a carrier to flow in a direction substantially perpendicular to a growth direction of the crystal is indicated by a solid line, and a TFT 104 formed to allow a carrier to flow in the growth direction of the crystal is indicated by a broken line. In any case, one or more TFTs can be formed with respect to one crystal grain.

Referring to FIG. 7B, when the curvature radius R of the isointensity line 50a is 0.3 μm, the radial angle θ of the crystal grain 52 becomes 60 degrees. However, considering a fluctuation in a position of the crystal grain boundary 52a (which means that the position fluctuates in the lateral direction as indicated by a broken line 52a' in the figure), the crystal grain boundary 52a does not intrude the channel region 104c, and excellent crystallization can be performed. Referring to FIG. 7C, when the curvature radius R of the isointensity line 50a is 0.4 μm, the radial angle θ of the crystal grain 52 becomes 40 degrees. Therefore, considering a fluctuation in a position of the crystal grain boundary 52a (which means that the position fluctuates in the lateral direction as indicated by a broken line 52a' in the figure), the crystal grain boundary 52a intrudes the channel region 104c when fabricating some of TFTs, and crystallization suitable for mass production of the TFTs cannot be carried out.

As explained above, in the present invention, the curvature radius of at least a part of the isointensity line corresponding to the boundary line between the region where the non-single crystal semiconductor film is completely molten and the non-melting region, i.e., the isointensity line corresponding to the outer edge of the non-melting region (the isointensity line of a light intensity associated with a melting temperature of the non-single crystal semiconductor film) must be set to 0.3 μm or below. As a result, in the present invention, crystal growth at a radial angle sufficiently large to prevent the crystal grain boundary from intruding the channel region of the TFT can be stably realized, and a reduction in an electric field effect mobility by carrier scattering due to the crystal grain boundary in the channel region can be avoided.

Figures 8A, 8B:
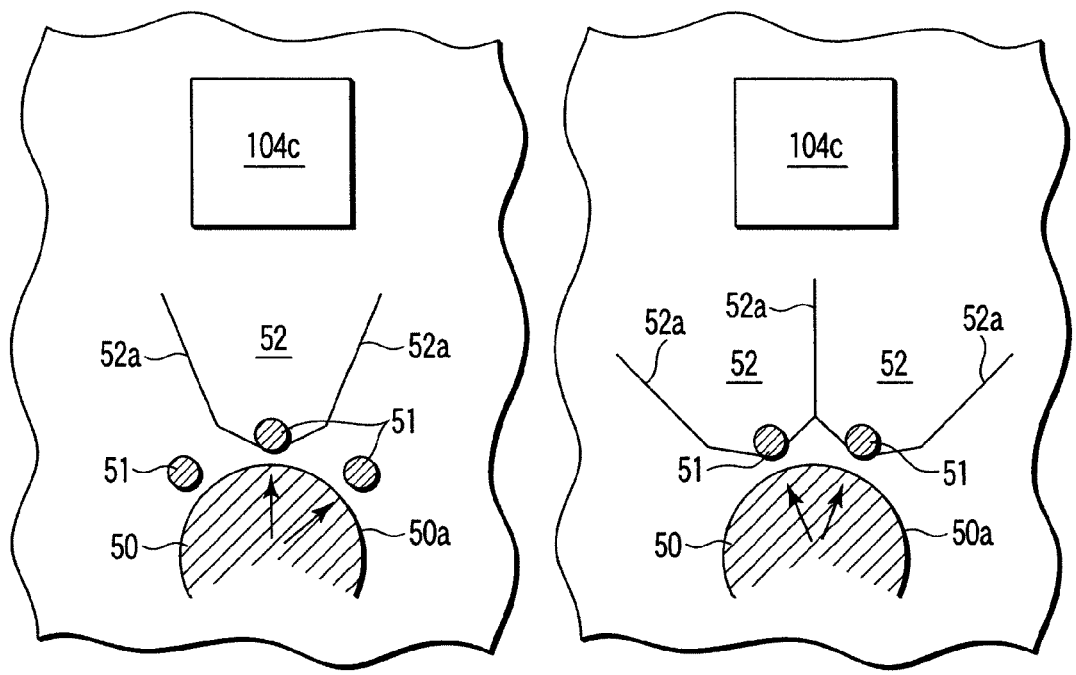
FIGS. 8A and 8B show a state of crystallization when the curvature radius of the isointensity line is fixed.

In order to generate a crystal nucleus or nuclei at a desired position or portions, it is preferable to substantially change the curvature radius of the isointensity line corresponding to the outer edge of the non-melting region along the isointensity line without fixing the curvature radius. As shown in FIGS. 8A and 8B, when the curvature radius of the isointensity line 50a is fixed as a whole (the isointensity line 50a has a substantially circular shape), each crystal nucleus 51 is generated at an arbitrary position along and near the isotemperature line 50a. As shown in FIG. 8A, when the crystal nucleus 51 is generated in a front direction (a direction extending from the center of the non-melting region 50 toward the center of the channel region 104c) of the channel region 104c, the crystal grain boundary 52a does not intrude the channel region 104c.

Figure 8C:
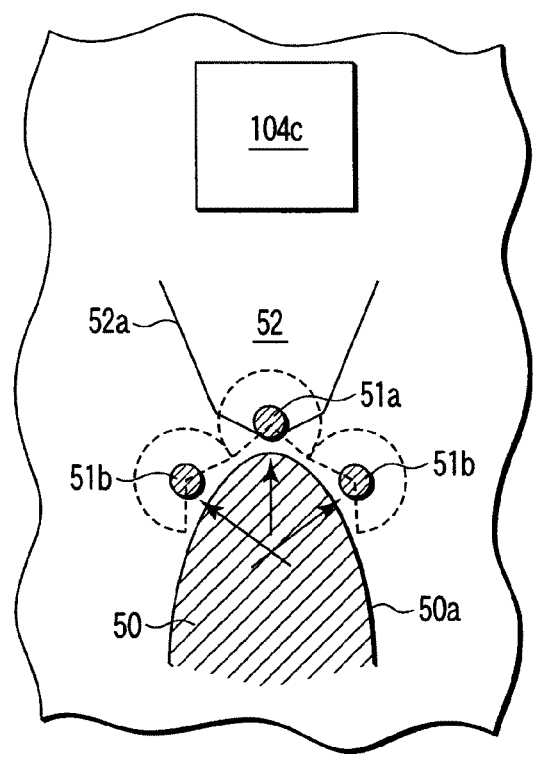
FIG. 8C shows a state of crystallization when the curvature radius of the isointensity line is changed.

However, as shown in FIG. 8B, when the crystal nucleus 51 is generated at a position which laterally deviates from the front direction of the channel region 104c, the crystal grain boundary 52a extends toward the channel region 104c and intrudes the channel region 104c. On the other hand, as shown in FIG. 8C, when the curvature radius of the isointensity line 50a substantially varies along the isointensity line (the isointensity line 50a has a substantially elliptic shape) and becomes minimum in the front direction of the channel region 104c, an area occupied by a liquid around the crystal nucleus 51 in the front direction of the channel region 104c (an area of a region defined by a circle indicated by a broken line in the figure and the isointensity line 50a) becomes larger than an area occupied by the liquid around a neighboring crystal nucleus 51b. As a result, a probability that the crystal nucleus 51 is generated in the front direction of the channel region 104c becomes high, and the crystal grain boundary 52a does not extend toward the front side of the channel region 104c and does not intrude the channel region 104c.

Figure 9A:
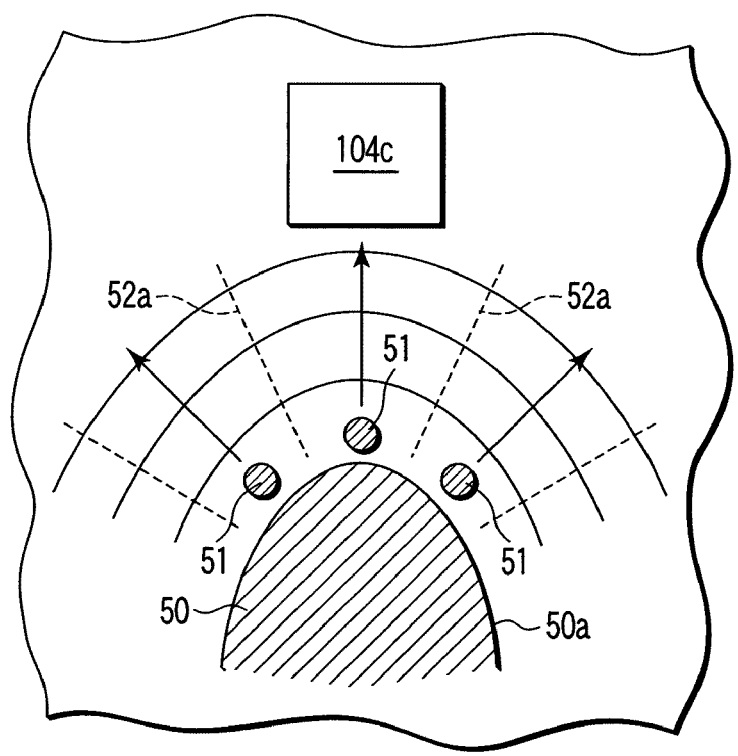
Figure 9B:
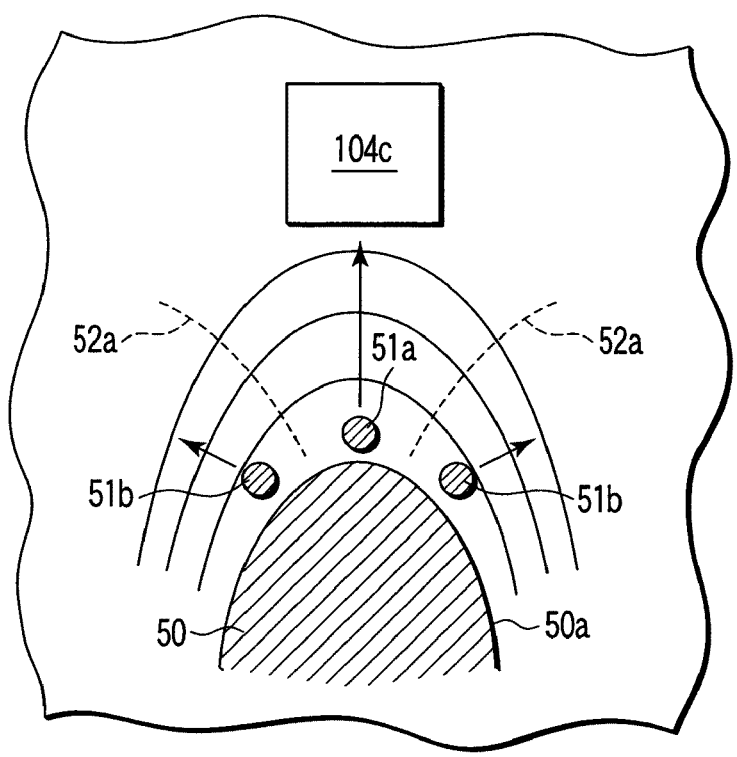

FIGS. 9A and 93 are views each showing a light intensity distribution in a region where crystals grow from the crystal nuclei 51 in the form of isointensity lines, in which FIG. 9A shows a light intensity distribution having substantially the same gradient in a radial direction and FIG. 9B shows a light intensity distribution having the highest gradient in the front direction of the channel region 104c. In general, crystal growth has properties that its speed is high when a temperature gradient is low. When the light intensity distribution in the region where crystals grow from the crystal nuclei has substantially the same gradient in the radial direction (toward the outside along a normal line of the isointensity lines) as shown in FIG. 9A, since crystal growth from the plurality of crystal nuclei 51 advances at substantially the same speed, the crystal grain boundaries 52a substantially linearly extend in a radial pattern, and grown crystal grains also have substantially the same radial angle.

On the other hand, when the light intensity distribution in the region where the crystals grow from the crystal nuclei has the lowest gradient in the front direction of the channel region as shown in FIG. 9B, a speed of crystal growth from the crystal nucleus 51a in the front direction of the channel region 104c becomes higher than that of crystal growth from each surrounding crystal nucleus 51b. Therefore, crystal growth from the crystal nucleus 51a precedes crystal growth from each neighboring crystal nucleus 51b, and the crystal grain boundary 52a of the crystal grain growing from the crystal nucleus 51a spreads and extends in a radial pattern. As a result, a radial angle of the crystal grain from the crystal nucleus 51a in the front direction of the channel region 104c becomes wider than that in FIG. 9A, and a possibility that the crystal grain boundary 52a intrudes the channel region 104c is further reduced.

As explained above, in order to assuredly grow a crystal from a crystal nucleus in the front direction of the channel region, it is preferable to generate a gradient distribution in which a radial light intensity is increased toward the outside from a region having the minimum curvature radius of the isointensity line of the light intensity associated with a melting temperature of the non-single crystal semiconductor film (the isointensity line corresponding to the outer edge of the non-melting region) in a region where the crystal grows from the crystal nucleus. Further, in order to reduce a possibility that the crystal grain boundary intrudes the channel region, a gradient distribution in which a change in a light intensity along the radial direction from a region having the minimum curvature radius of the isointensity line of the light intensity associated with a melting temperature is gentler than a change in a light intensity along the radial direction from a peripheral region is preferable. In other words, a gradient distribution in which a change in a light intensity along a specific direction from a region having the minimum curvature radius of the isointensity line of the light intensity associated with the melting temperature is gentler than a change in a light intensity along a direction around this specific direction.

Figure 10:
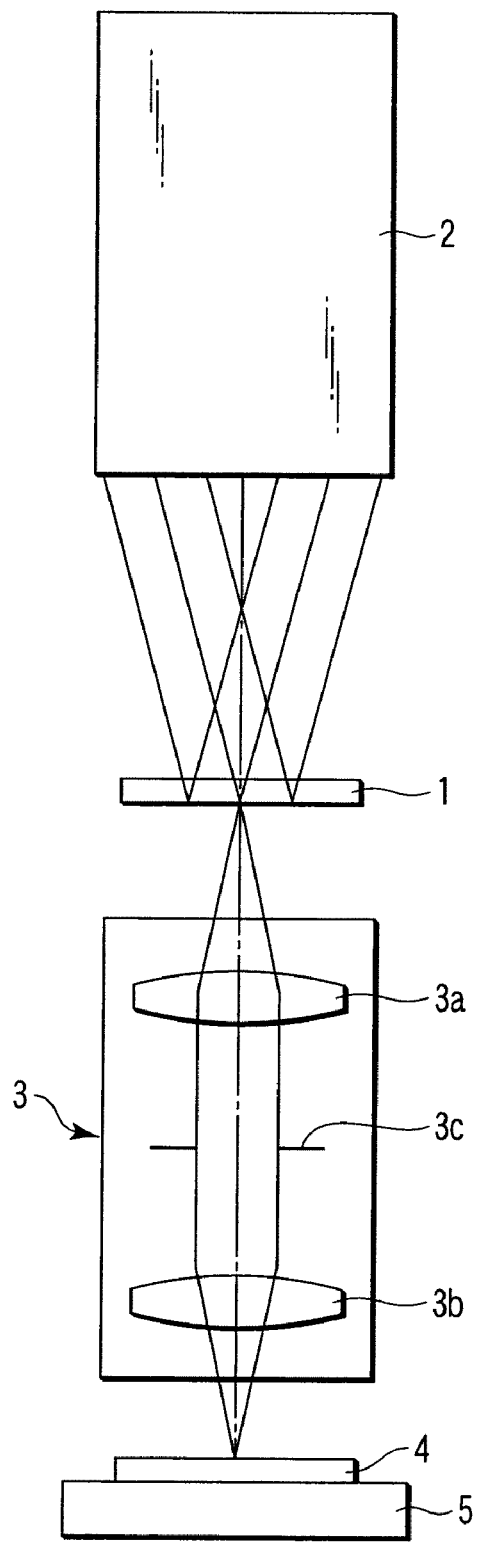
FIG. 10 is a view schematically showing a structure of a crystallization apparatus according to an embodiment of the present invention.
Figure 11:
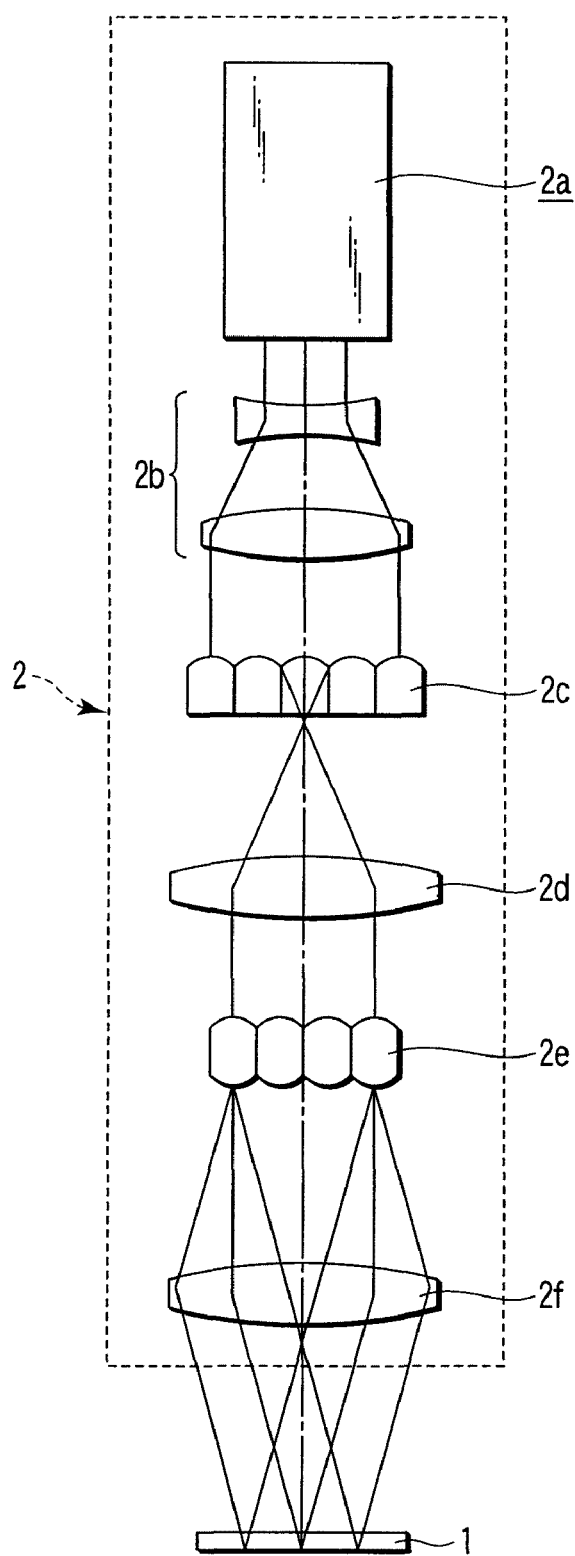
FIG. 11 is a view schematically showing an internal structure of an illumination system depicted in FIG. 10.

An embodiment according to the present invention will now be explained with reference to the accompanying drawings. FIG. 10 is a view schematically showing a structure of a crystallization apparatus according to the embodiment of the present invention. FIG. 11 is a view schematically showing an internal structure of an illumination system depicted in FIG. 10. Referring to FIGS. 10 and 11, the crystallization apparatus according to this embodiment includes a light modulation element 1 that modulates a phase of an incident light beam or flux to form a light beam or flux having a predetermined light intensity distribution, an illumination system 2 that illuminates the light modulation element 1 with a laser beam, an image forming optical system 3, and a substrate stage 5 that holds a processing target substrate 4.

A structure and a function of the light modulation element 1 will be explained later. The illumination system 2 includes an XeCl excimer laser source 2a that supplies a laser beam having a wavelength of, e.g., 308 nm. As the beam source 2a, any other appropriate beam source having performances of emitting an energy light beam that melts a processing target substrate 4 (a non-single crystal semiconductor film formed on a substrate of, e.g., glass or a non-single crystal semiconductor substrate) like a KrF excimer laser source or a YAG laser source can be used. A laser beam supplied from the laser source 2a is expanded through a beam expander 2b and then enters a first fly-eye lens 2c.

In this manner, a plurality of small light sources are formed on a rear focal plane of the first fly-eye lens 2c, and an incidence plane of a second fly-eye lens 2e is illuminated with light fluxes from the plurality of small light sources through a first condenser optical system 2d in an overlapping manner. As a result, more small light sources than those on the rear focal plane of the first fly-eye lens 2c are formed on a rear focal plane of the second fly-eye lens 2e. The light modulation element 1 is illuminated with light fluxes or laser beam from the plurality of small light sources formed on the rear focal plane of the second fly-eye lens 2e through a second condenser optical system 2f in an overlapping manner.

The first fly-eye lens 2c and the first condenser optical system 2d constitute a first homogenizer. This first homogenizer homogenizes an incidence angle of the laser fluxes emitted from the beam source 2a on the light modulation element 1. Further, the second fly-eye lens 2e and the second condenser optical system 2f constitute a second homogenizer. This second homogenizer homogenizes a light intensity of the laser beam having the homogenized incidence angle from the first homogenizer at each in-plane position on the light modulation element 1.

The laser beam subjected to phase modulation by the light modulation element 1 is incident onto the processing target substrate 4 through the image forming optical system 3. Here, the image forming optical system 3 is arranged to optically conjugate a phase pattern surface of the light modulation element 1 with the processing target substrate 4. In other words, the processing target substrate 4 (an irradiation target surface of the processing target substrate 4 in a precise sense) is set to a surface that is optically conjugated with the phase pattern surface of the light modulation element 1 (an image surface of the image forming optical system 3).

The image forming optical system 3 includes, e.g., two positive lens groups 3a, 3b, and an aperture stop 3c arranged between the lens groups. A size of an aperture portion (a light transmitting portion) of the aperture stop 3c (i.e., an image-side numerical aperture NA of the image forming optical system 3) is set to generate a necessary light intensity distribution on an upper surface (the irradiation target surface) of the processing target substrate 4. The image forming optical system 3 may be of a refractive optical system, a reflective optical system, or a refractive-reflective optical system.

The processing target substrate 4 is specifically constituted by forming a lower layer insulating film, a non-single crystal semiconductor thin film, and an upper layer insulating film on a glass substrate in the mentioned order in this embodiment. More specifically, in this embodiment, the processing target substrate 4 has a structure in which an underlying insulating film, a non-single crystal semiconductor film (e.g., an amorphous silicon film), and a cap film are sequentially formed on a liquid crystal display glass sheet by a chemical vapor deposition (CVD) method, for example. Each of the underlying insulating film and the cap film is an insulating film, e.g., an $SiO_2$ film. The underlying insulating film prevents a foreign matter, e.g., Na in the glass substrate from being mixed into the amorphous silicon film when the amorphous silicon film directly comes into contact with the glass substrate, and avoids direct transmission of heat of the amorphous silicon film to the glass substrate.

The amorphous silicon film is a semiconductor film to be crystallized. The cap film is heated by a part of a light beam entering the amorphous silicon film and stores this heated temperature. When incidence of the light beam is interrupted, a temperature of a high-temperature portion is relatively rapidly reduced on an irradiation target surface of the amorphous silicon film. However, this thermal storage effect alleviates this temperature drop gradient and facilitates growth of a crystal having a large particle diameter in a lateral direction. The processing target substrate 4 is positioned and held at a predetermined position on the substrate stage 5 by a vacuum chuck or an electrostatic chuck.

Figure 12:
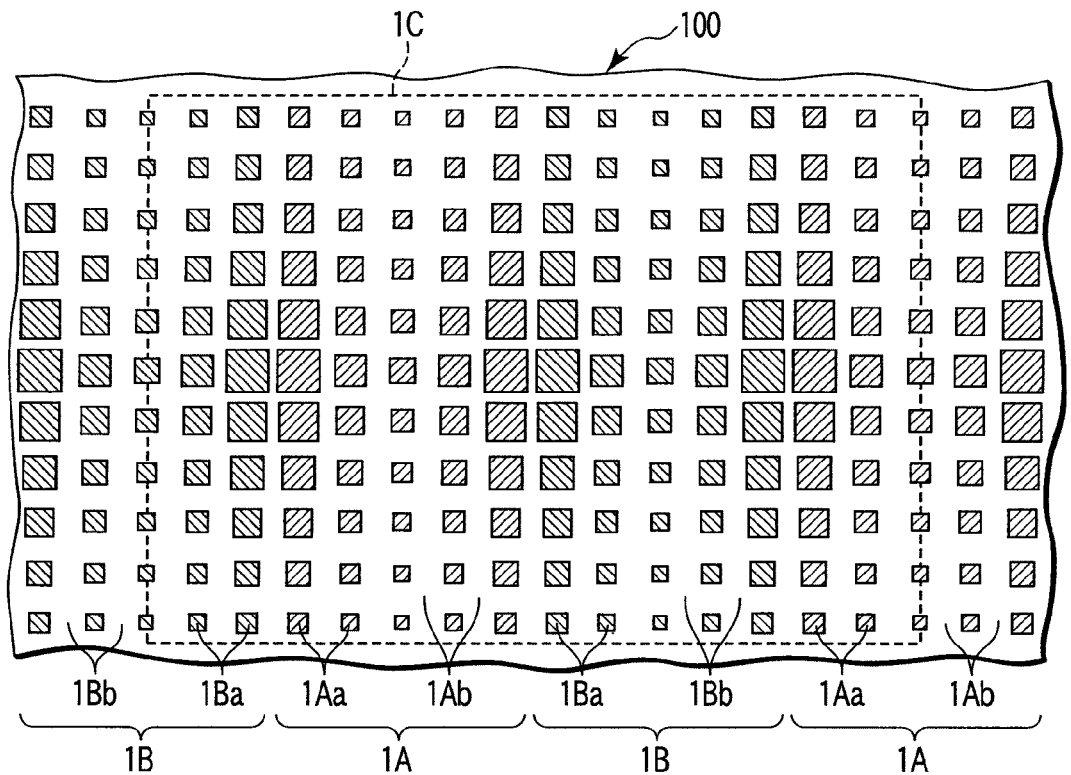
FIG. 12 is a view schematically showing a structure of a light modulation element in the embodiment.

FIG. 12 is a view schematically showing a structure of the light modulation element in this embodiment. The light modulation element 1 in this embodiment has a repeated structure along a direction (a horizontal direction in the figure) perpendicular to one direction (a vertical direction in the figure) of each first strip-like region 1A and each second strip-like region 1B extending in the one direction. In the first strip-like region 1A, each rectangular region 1Aa indicated by a hatching portion in the figure has a phase value of −60 degrees, and a region 1Ab indicated by a blank portion in the figure has a phase value of 0 degree. On the other hand, in the second strip-like region 1B, each rectangular region 1Ba indicated by a hatching portion in the figure has a phase value of +60 degrees, and a region 1Bb indicated by a blank portion in the figure has a phase value of 0 degree.

As explained above, the value of +60 degrees means phase advance and the value of −60 degrees means phase retardation with respect to the phase value 0 degree serving as a reference. Furthermore, a pitch of the strip-like regions 1A and 1B is 5 μm when converted into the image surface of the image forming optical system 3. In other words, in the respective strip-like regions 1A and 1B, 5×11 square cells (unit regions) each having a size of 1 μm×1 μm when converted into the image surface of the image forming optical system 3 are aligned lengthwise and crosswise at a fixed pitch. Here, the size 1 μm×1 μm of each cell when converted into the image surface of the image forming optical system 3 is set to be smaller than a radius of a point image distribution range of the image forming optical system 3.

Moreover, in the first strip-like region 1A, an area share ratio of the region 1Aa in each cell (i.e., a ratio of the regions 1Aa and 1Ab in each cell) varies along a pitch direction of the strip-like regions (a direction perpendicular to a boundary line between the strip-like regions 1A and 1B: the horizontal direction in the figure) and also varies along a pitch perpendicular direction perpendicular to the pitch direction of the strip-like regions (a direction along the boundary line of the strip-like regions 1A and 1B: the vertical direction in the figure). More specifically, the area share ratio of the region 1Aa along the pitch direction of the strip-like regions is minimum at the center of the strip-like region 1A and increased toward each of both ends of this region. On the other hand, the area share ratio of the region 1Aa along the pitch perpendicular direction of the strip-like regions is maximum at the center of the strip-like region 1A and decreased toward each of both ends of this region. In other words, in the first strip-like region 1A, a first specific position where the area share ratio of the region 1A in the cell as the unit region is maximum is present to be adjacent to the boundary line, and the area share ration of the region 1Aa is decreased as distanced from the first specific position along the pitch perpendicular direction and also reduced as distanced from the first specific position along the pitch direction.

Likewise, in the second strip-like region 1B, an area share ratio of the region 1Ba in each cell (i.e., a ratio of the regions 1Ba and 1Bb in each cell) varies along the pitch direction of the strip-like regions and also varies along the pitch perpendicular direction of the strip-like regions. More specifically, the area share ratio of the region 1Ba along the pitch direction of the strip-like regions is minimum at the center of the strip-like region 1B and increased toward each of both ends of this region. On the other hand, the area share ratio of the region 1Ba along the pitch perpendicular direction of the strip-like regions is maximum at the center of the strip-like region 1B and reduced toward each of both ends of this region. In other words, in the strip-like region 1B, a second specific position where the area share ratio of the region 1Ba in the cell as the unit region is present to be adjacent to the boundary line, and the area share ratio of the region 1Ba is reduced as distanced from the second specific region along the pitch perpendicular direction and also reduced as distanced from the second specific position along the pitch direction.

In the optical system according to this embodiment, a light intensity distribution formed on the processing target substrate 4 by using the light modulation element 1 depicted in FIG. 12 is calculated. Calculation conditions are as follows. That is, a wavelength of light is 308 nm, an object-side numerical aperture of the image forming optical system 3 is 0.15, a coherence factor (an illumination σ value; an exit-side numerical aperture of the illumination system 2/the object-side numerical aperture of the image forming optical system 3) is 0.5, and an image forming magnification of the image forming optical system 3 is ⅕.

Figure 13:
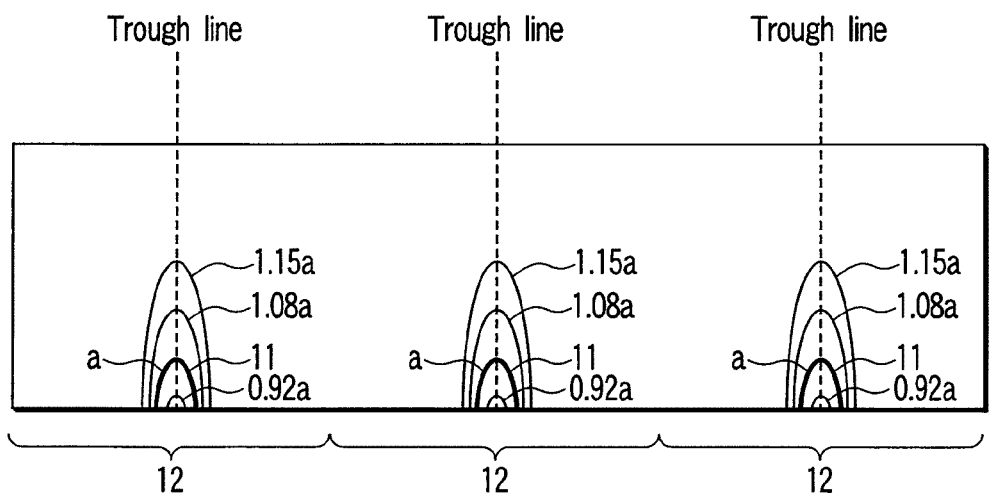
FIG. 13 is a view showing a light intensity distribution obtained on a non-single crystal semiconductor film by using the light modulation element depicted in FIG. 12.

In the optical system according to this embodiment, such a light intensity distribution as depicted in FIG. 13 is obtained as a result of calculation. FIG. 13 shows a light intensity distribution formed on the processing target substrate 4 in association with an approximately half upper region in a rectangular region 1C indicated by a broken line in FIG. 12 in the form of contour lines (i.e., isointensity lines) of a light intensity. In FIG. 13, the isointensity lines corresponding to light intensities higher than 1.15a are omitted to clarify the figure. Additionally, the light modulation element 1 depicted in FIG. 12 was actually fabricated, and a light intensity distribution formed on the processing target substrate 4 by using the optical system including the fabricated light modulation element 1 and the image forming optical system 3 was measured. As a result of the measurement, substantially the same result as the light intensity distribution depicted in FIG. 13 was obtained.

In FIG. 13, a light intensity associated with a melting temperature of the non-single crystal semiconductor film on the processing target substrate 4 is a, an isointensity line of the light intensity a (an isointensity line associated with an outer edge of the non-melting region on the non-single crystal semiconductor film and a crystallization start point) 11 has an elliptic shape which is long in the vertical direction in the figure, and its curvature radius has a minimum value 0.2 μm at each of an upper end and a lower end (not shown) in the figure. In this manner, the light modulation element 1 depicted in FIG. 12 is designed to enable irradiating the processing target substrate (the non-single crystal semiconductor film) 4 with light having the light intensity distribution in which a part of the isointensity line 11 corresponding to the outer edge of the non-melting region has the curvature radius of 0.3 μm or below. It is to be noted that each of a part of an isointensity line of a light intensity 0.92a and a part of an isointensity line of a light intensity 1.08a has a curvature radius of 0.3 μm or below.

Figure 14:
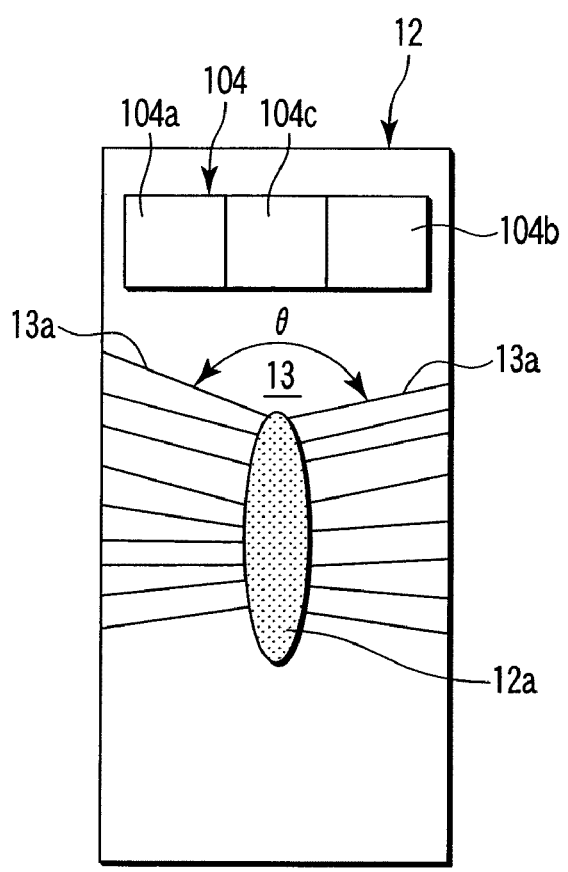
FIG. 14 is a view schematically showing a state of crystallization when the non-single crystal semiconductor film is irradiated with light having the light intensity distribution depicted in FIG. 13.

When the non-single crystal semiconductor film of the processing target substrate 4 is irradiated with light having a light intensity distribution depicted in FIG. 13, a non-melting region 12a defined by the elliptic isointensity line 11 of the light intensity a is formed on one crystallization unit region 12 on the non-single crystal semiconductor film as schematically shown in FIG. 14. Further, a crystal grain 13 grows from a crystal nucleus formed near an upper end of the non-melting region 12a in the figure at a large radial angle θ of, e.g., 100 degrees or above toward a front direction of a channel region 104c (a direction from the center of the non-melting region 12a toward the center of the channel region 104c). That is, two crystal grain boundaries 13a adjacent to each other to form the large radial angle θ of, e.g., 100 degrees or above radially extend from the crystal nucleus. As a result, the crystal grain boundaries 13a do not intrude the channel region 104c. It is to be noted that a size of the crystallization unit region 12 is set to 10 μm×5 μm in length and breadth in FIG. 14 for the above-explained reason.

In particular, since the light modulation element 1 is constituted in such a manner that the curvature radius of the isointensity line 11 substantially varies along the isointensity line and becomes minimum in the front direction of the channel region 104c in this embodiment, a probability that the crystal nucleus is generated in the front direction of the channel region 104c is high. As a result, each crystal grain boundary 13a does not extend toward the front side of the channel region 104c, and a possibility that each crystal grain boundary 13a intrudes the channel region 104c is low. Further, in this embodiment, since the light intensity distribution in a region where the crystal grows from the crystal nucleus has the lowest gradient in the front direction of the channel region 104c, the crystal grain 3 grows into a folding-fan shape from the crystal nucleus in the front direction of the channel region 104c, and the possibility that each crystal grain boundary 13a intrudes the channel region 104c is further reduced.

Figure 15:
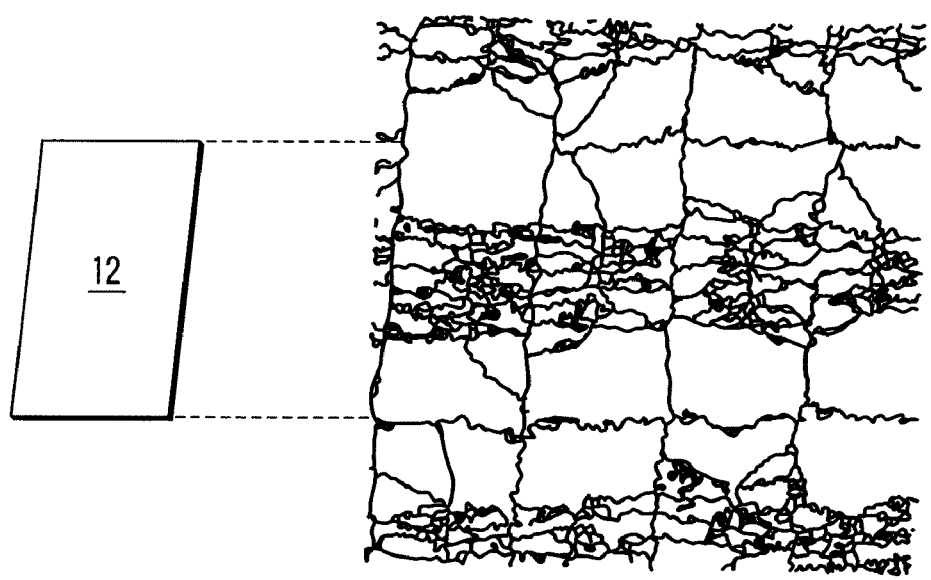
FIG. 15 is a view showing a crystal structure obtained by an experiment where an actually fabricated processing target substrate is irradiated with light having the light intensity distribution depicted in FIG. 13.

In this embodiment, the processing target substrate 4 was actually fabricated, and an experiment of irradiating the fabricated processing target substrate 4 with light having the light intensity distribution depicted in FIG. 13 was conducted. When fabricating the processing target substrate 4, a glass substrate having a thickness of 700 μm was prepared, an $SiO_2$ film having a thickness of 500 nm was formed on the glass substrate as the lower layer insulating film, an amorphous silicon film having a thickness of 100 nm was formed on the lower layer insulating film as the non-single crystal semiconductor film, and an $SiO_2$ film having a thickness of 400 nm was formed on the non-single crystal semiconductor film as the upper layer insulating film (the cap film) by a plasma CVD. As a result of this experiment, such a crystal structure (a distribution of crystal grain boundaries) as depicted in FIG. 15 was obtained. Referring to FIG. 15, it can be understood that crystal grains each having a radial angle of 100 degrees or above are stably generated and crystal grain boundaries do not intrude a channel region when fabricating a TFT.

It is known that a laser output intensity of an excimer laser beam varies in accordance with each pulse. In a general excimer laser apparatus, a fluctuation of approximately ±2.5% in an output intensity is unavoidable. When a light intensity on the non-single crystal semiconductor film varies due to a fluctuation in the output intensity of the laser apparatus, an isointensity line corresponding to a crystal growth start intensity also changes. For example, when the light intensity a is adjusted to the crystal growth start intensity in an average laser output intensity, a 2.5% increase in the laser output intensity changes the light intensity corresponding to the crystal growth start intensity to $a/(1+0.025)$. In this case, if a minimum value of a curvature radius of an isointensity line corresponding to the intensity $a/(1+0.025)$ is higher than 0.3 μm, an excellent crystal shape cannot be obtained. In other words, when the curvature radius of at least a part of the corresponding isointensity line is adjusted to keep the minimum value of 0.3 μm or below even through the laser output intensity varies in the range of, e.g., +2.5%, the crystal shape can be stably maintained even though the laser output intensity fluctuates. As explained above, in FIG. 13, the curvature radius of the isointensity line of the light intensity is 0.3 μm or below along each trough line. In this embodiment, the crystal shape can be stably maintained even if the laser output intensity varies.

Figure 16A:
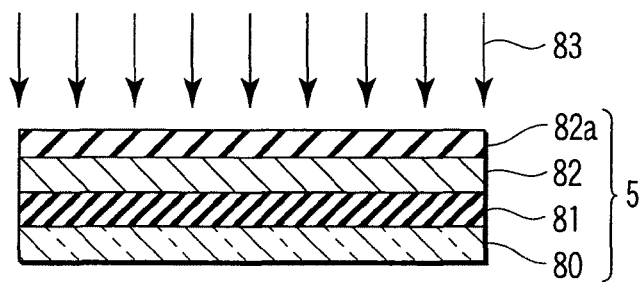
FIGS. 16A to 16E are process cross-sectional views for respectively showing processes of fabricating an electronic device by using the crystallization apparatus according to the embodiment.

FIGS. 16A to 16E are process cross-sectional views showing respective steps of manufacturing an electronic device in a region crystallized by using the crystallization apparatus according to this embodiment. As shown in FIG. 16A, a processing target substrate 5 is prepared. The processing target substrate 5 is obtained by sequentially forming an underlying film 81 (e.g., a film like a laminated film containing SiN having a film thickness of 50 nm and $SiO_2$ having a film thickness of 100 nm), an amorphous semiconductor film (a semiconductor film formed of, e.g., Si, Ge, or SiGe having a film thickness of 50 nm to 20 nm), and a cap film 82a (e.g., an $SiO_2$ film having a film thickness of 30 nm to 300 nm) on a transparent insulating substrate 80 (formed of, e.g., alkali glass, quartz glass, plastic, or polyimide) by a chemical vapor deposition method or a sputtering method. Then, a predetermined region on a surface of the amorphous semiconductor film 82 is temporarily irradiated with a laser beam 83 (e.g., a KrF excimer laser beam or an XeCl excimer laser beam) once or more by using the crystallization method and apparatus adopting the light modulation element depicted in FIG. 4 or 9 according to this embodiment, thereby growing the above-explained needle-like crystals.

Figure 16B:
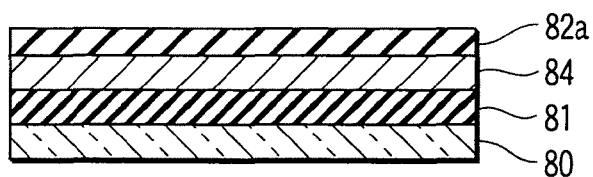
Figure 16C:
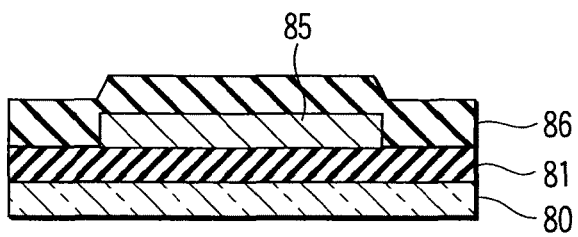
Figure 16D:
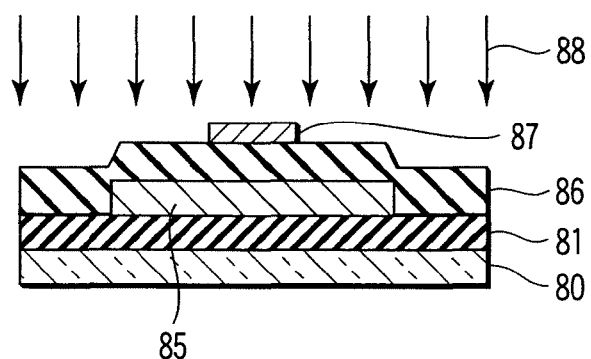
Figure 16E:
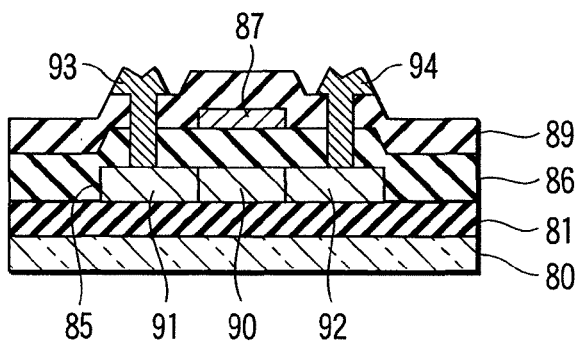

In this manner, as shown in FIG. 16B, a polycrystal semiconductor film or a single-crystallized semiconductor film (a crystallized region) 84 having crystal particles with a large diameter or width is formed in the irradiation region of the amorphous semiconductor film 82. Subsequently, the cap film 82a is removed from the semiconductor film 84 by etching. Thereafter, as shown in FIG. 16C, the polycrystal semiconductor film or the single-crystallized semiconductor film 84 is processed into, e.g., a plurality of island-shaped semiconductor films (crystallized island-shaped regions) 85 each serving as a region in which a thin film transistor is formed by using a photolithography technology as shown in FIG. 16C. An $SiO_2$ film having a film thickness of 20 nm to 100 nm is formed as a gate insulating film 86 on a surface of the semiconductor film 85 by using the chemical vapor deposition method or the sputtering method. Moreover, as shown in FIG. 16D, a gate electrode 87 (made of a metal e.g., silicide or MoW) is formed on a part of the gate insulating film, and the gate electrode 87 is used as a mask to implant impurity ions 88 (phosphor in case of an N-channel transistor, or boron in case of a P-channel transistor) into the semiconductor film 85 as indicated by arrows. Then, annealing processing (e.g., at 450° C. for one hour) is carried out in a nitrogen atmosphere to activate the impurity, thereby forming a source region 91 and a drain region 92 in the island-shaped semiconductor film 85 on both sides of a channel region 90. A position of such a channel region 90 is set in such a manner that carriers move in a growth direction or a direction normal to the growth direction of the large diameter or broad width crystal particle. Then, as shown in FIG. 16E, an interlayer insulating film 89 that covers the entire product is formed, and contact holes are formed in this interlayer insulating film 89 and the gate insulating film 86, and then a source electrode 93 and a drain electrode 94 are formed in the holes so that they are respectively connected with the source region 91 and the drain region 92.

At the above-explained steps, when the gate electrode 87 is formed in accordance with a position in a plane direction of each crystal having a large particle diameter of the polycrystal semiconductor film or the single-crystallized semiconductor film 84 generated at the steps depicted in FIGS. 16A and 16B, thereby forming the channel 90 below the gate electrode 87. With the above-explained steps, a polycrystal transistor or a thin film transistor (TFT) in the single-crystallized semiconductor can be formed. The thus manufactured polycrystal transistor or single-crystallized transistor can be applied to a drive circuit of a liquid crystal display (a display) or an EL (electroluminescence) display or an integrated circuit, e.g., a memory (an SRAM or a DRAM) or a CPU. The processing target in the present invention is not restricted to one on which a semiconductor device is formed, and the semiconductor device is not restricted to a TFT either.

In the above explanation, the present invention is carried out by using a phase shift type light modulation element as the light modulation element. However, the present invention is not restricted thereto. The present invention can be carried out by using a light modulation element adopting other modes, e.g., a transmission type light modulation element having a predetermined transmission pattern or a reflection type light modulation element having a predetermined reflection pattern, or a light modulation element that is a combination of these elements having a first modulation region where a first light intensity distribution in which a light intensity varies in a first direction of the light modulation element is generated on an irradiation target plane and a second modulation region where a second light intensity distribution in which a light intensity varies in a second direction different from the first direction is generated on the irradiation target plane.

Additionally, the present invention is applied to the crystallization apparatus and the crystallization method of irradiating the non-single crystal semiconductor film with light having a predetermined light intensity distribution to generate the crystallized semiconductor film in the above explanation. However, the present invention is not restricted thereto, and can be generally applied to a light irradiation apparatus that forms a predetermined light intensity distribution on a predetermined irradiation target plane via the image forming optical system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light modulation element which forms a predetermined light intensity distribution based on incident light,
   wherein a basic pattern of the light modulation element has a first strip-like region and a second strip-like region adjacent to the first strip-like region,
   a ratio of a first region having a first phase value and a second region having a second phase value varies in a first direction along a boundary line between the first strip-like region and the second strip-like region and a second direction perpendicular to the boundary line in accordance with each unit region in the first strip-like region, and
   a ratio of the first region having the first phase value and a third region having a third phase value varies in the first direction and the second direction in accordance with each unit region in the second strip-like region.

2. The element according to claim 1, wherein a first specific position at which an area share ratio of the second region in the unit region is maximum is present to be adjacent to the boundary line and the area share ratio of the second region is decreased as distanced from the first specific position along the first direction and decreased as distanced from the first specific position along the second direction in the first strip-like region, and
   a second specific position at which an area share ratio of the third region in the unit region is maximum is present to be adjacent to the boundary line and the area share ratio of the third region is decreased as distanced from the second specific region along the first direction and decreased as distanced from the second specific region along the second direction in the second strip-like region.

3. The element according to claim 1, wherein a relative phase amount of the second phase value with respect to the first phase value and a relative phase amount of the third phase value with respect to the first phase value have absolute values equal to each other and signs different from each other.

* * * * *